US009230697B2

(12) United States Patent
Groome et al.

(10) Patent No.: US 9,230,697 B2
(45) Date of Patent: Jan. 5, 2016

(54) STEAM GENERATOR FOR A NUCLEAR REACTOR

(75) Inventors: John T. Groome, Corvallis, OR (US); Sooyun Joh, Corvallis, OR (US); James Allan Nylander, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 659 days.

(21) Appl. No.: 13/451,759

(22) Filed: Apr. 20, 2012

(65) Prior Publication Data

US 2013/0279643 A1  Oct. 24, 2013

(51) Int. Cl.
| | | |
|---|---|---|
| G21C 19/28 | (2006.01) |
| G21C 15/16 | (2006.01) |
| G21D 1/00 | (2006.01) |
| F22B 1/16 | (2006.01) |
| G21C 1/32 | (2006.01) |

(52) U.S. Cl.
CPC .............. G21C 15/16 (2013.01); F22B 1/162 (2013.01); G21D 1/006 (2013.01); G21C 1/322 (2013.01); Y02E 30/40 (2013.01)

(58) Field of Classification Search
CPC .......... G21C 1/32; G21C 1/322; G21C 1/324; G21C 1/326; G21C 1/328; F22B 1/026; F22B 1/162
USPC ........................................................ 376/406
See application file for complete search history.

(56) References Cited

U.S. PATENT DOCUMENTS

| 3,859,964 A * | 1/1975 | Kozeki ............................ 122/32 |
| 4,124,064 A * | 11/1978 | Jabsen et al. .................... 165/69 |
| 2004/0114705 A1 | 6/2004 | Kitch |
| 2010/0316181 A1 * | 12/2010 | Thome et al. ................. 376/372 |

FOREIGN PATENT DOCUMENTS

| JP | 2001188093 A | 7/2001 |
| WO | WO2011097597 A1 | 8/2011 |
| WO | WO2012047438 A1 | 4/2012 |
| WO | WO2013158950 A3 | 10/2013 |

OTHER PUBLICATIONS

Authorized Officer Kihwan Moon, International Preliminary Report on Patentability for related International Application No. PCT/US2013/037292, mailed Oct. 30, 2014, 6 pages.
Authorized Officer Hye Lyun Park, International Search Report and the Written Opinion for related International Application No. PCT/US2013/037292, mailed Oct. 21, 2013, 9 pages.

* cited by examiner

Primary Examiner — Marshall O'Connor
(74) Attorney, Agent, or Firm — Lowe Graham Jones PLLC

(57) ABSTRACT

A steam generator for a nuclear reactor comprises plenums proximate with a first plane, wherein the first plane intersects a bottom portion of a riser column of a reactor vessel. The steam generator may further comprise plenums proximate with a second plane, approximately parallel with the first plane, wherein the second plane intersects a top portion of the riser column of the reactor vessel. The steam generator may further include a plurality of steam generator tubes that convey coolant from a plenum located proximate with the first plane to one of the plenums proximate with the second plane.

16 Claims, 4 Drawing Sheets

STEAM GENERATOR FOR A NUCLEAR REACTOR

BACKGROUND

In a nuclear reactor, a core of nuclear material is confined to a small volume internal to the reactor so that a reaction may occur. In many instances, a controlled nuclear reaction may persist for an extended period of time, such as several years, before refueling of the reactor core is required. Accordingly, when used as a source of heat for converting water into steam, a properly designed nuclear reactor may provide a carbon-free, stable, and highly reliable source of energy.

A nuclear reactor may make use of a working fluid, such as water, which may be converted to steam at a pressure significantly above atmospheric pressure. The pressurized steam may then be used to drive a turbine for converting mechanical energy to electric current. The steam may then be condensed back into water, and returned to the reactor. In many nuclear reactors, the cycle of vaporization, condensation, and vaporization of the working fluid may continue day after day and year after year.

Thus, a significant feature of a nuclear reactor may be a steam generator that receives liquid coolant at an input side, vaporizes the coolant by way of exposure to the heat source of the nuclear reactor, and provides the vaporized coolant to the input of a turbine. Accordingly, the efficiency, ease of manufacture, performance, and the safety features of the steam generator represent areas of continued investigation, analysis, and evaluation.

SUMMARY

In some embodiments, a steam generator for a nuclear reactor comprises three or more plenums proximate with a first plane, wherein the first plane intersects a bottom portion of a column of a reactor vessel. The steam generator may further comprise three or more plenums proximate with a second plane, approximately parallel with the first plane, wherein the second plane intersects a top portion of the column. The steam generator may further include a plurality of steam-generating tubes from a flowpath that conveys coolant from one of the three or more plenums located proximate with the first plane to at least one of the three or more plenums proximate with the second plane.

In other embodiments, a top portion of a steam generator includes three or more plenums disposed in a plane at approximately 90-degree intervals around a riser column, wherein at least one plenum of the three or more plenums includes an approximately flat tubesheet that faces a bottom portion of the steam generator, and wherein the approximately flat tubesheet of the at least one plenum includes a plurality of perforations, wherein the plurality of perforations changes in density between an area near an inner edge of the at least one plenum and an area near an outer edge of the at least one plenum.

In other embodiments, a method of operating a nuclear reactor includes conveying a working fluid from a first group of three or more plenums to a plurality of flowpaths, vaporizing the working fluid in at least some of the plurality of flowpaths, wherein the vaporizing results, at least in part, from coupling thermal energy from a reactor coolant to the at least some of the plurality of flowpaths. The method may further include transferring the vaporized coolant to a second group of three or more plenums.

BRIEF DESCRIPTION OF THE DRAWINGS

Non-limiting and non-exhaustive aspects are described with reference to the following figures.

DETAILED DESCRIPTION

Figure 1:
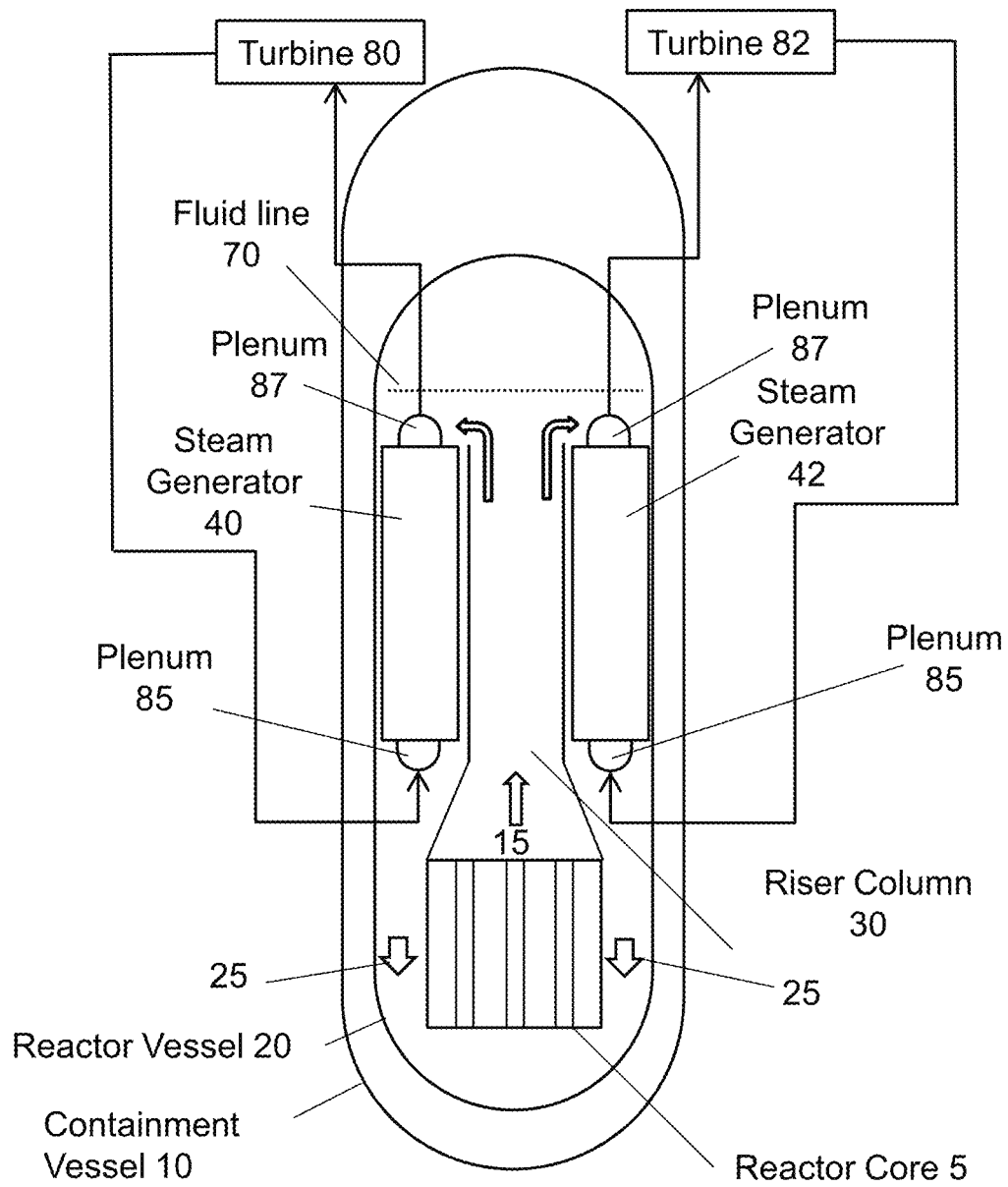
FIG. 1 is a diagram of a nuclear reactor module employing a steam generator according to an example embodiment.

Various systems and arrangements of a steam generator used in a nuclear reactor are described. In implementations, a group of plenums, wherein the group may include four plenums, may be arranged in a first plane at 90-degree increments around a bottom portion of an approximately cylindrical riser column of a nuclear reactor. A second group of plenums, wherein the second group may include four plenums, may be arranged in a second plane at 90-degree increments around a top portion of a cylindrical column of a nuclear reactor. Plenums located at both the top and bottom portions of the cylindrical riser column may include a substantially or approximately flat tubesheet having perforations that permit coupling to one of the plurality of steam generator tubes. In some embodiments, an orifice may be disposed within with at least some perforations of the plenums located proximate with the bottom portion of the cylindrical riser column. The presence of an orifice may result, at least in part, in a decrease in pressure as fluid flows upward from the plenum at the bottom portion of the riser.

In certain other embodiments, three plenums may be arranged in a first plane at 120-degree around a bottom portion of an approximately cylindrical riser column of a nuclear reactor. A second group of plenums, wherein the second group may include three plenums, may be arranged in a second plane at 120-degrees around a top portion of a cylindrical riser column of a nuclear reactor. Plenums located at both the top and bottom portions of the cylindrical riser column may include substantially or approximately flat tubesheets having perforations that permit coupling to one or more of the plurality of steam generator tubes that form a flowpath between plenums located at the bottom and top portions of the cylindrical riser column. In some embodiments, an orifice may be disposed within at least some perforations of the plenums located proximate with the bottom portion of the cylindrical riser column. The presence of an orifice may result, at least in part, in a decrease in pressure as fluid flows upward from the plenum at the bottom portion of the riser.

In certain embodiments, perforations in one or more of the approximately flat tubesheets of the plenums may be lower in density (for example, fewer in number per unit of area of the tubesheet) near an edge of the plenums closer to the cylindrical riser column and be of higher density (for example, greater in number per unit of area) nearby an outer wall of the reactor vessel enclosing the steam generator. Such a change in density of the perforations in the approximately flat tubesheet may result in an approximately uniform coupling of heat from a primary fluid within the reactor vessel to a secondary, working fluid within the steam generator tubes.

As used herein and as described in greater detail in subsequent sections, embodiments of the invention may include various nuclear reactor technologies. Thus, some implementations may include nuclear reactors that employ uranium oxides, uranium hydrides, uranium nitrides, uranium carbides, mixed oxides, and/or other types of radioactive fuel. It should be noted that embodiments are not limited to any particular type of reactor cooling mechanism, nor to any particular type of fuel employed to produce heat within or associated with a nuclear reaction.

FIG. 1 is a diagram of a nuclear reactor module employing a steam generator according to an example embodiment. In FIG. 1, reactor core 5 is positioned at a bottom portion of a cylinder-shaped or capsule-shaped reactor vessel 20. Reactor core 5 comprises a quantity of fissile material that generates a controlled reaction that may occur over a period of, for example, several years. Although not shown explicitly in FIG. 1, control rods may be employed to control the rate of fission within reactor core 5. Control rods may comprise silver, indium, cadmium, boron, cobalt, hafnium, dysprosium, gadolinium, samarium, erbium, and europium, or their alloys and compounds. However, these are merely a few of many possible control rod materials.

In implementations, a cylinder-shaped or capsule-shaped containment vessel 10 surrounds reactor vessel 20 with the containment vessel being partially or completely submerged within a pool of water or other fluid coolant. The volume between reactor vessel 20 and containment vessel 10 may be partially or completely evacuated to reduce heat transfer from reactor vessel 20 to the external environment. However, in other embodiments, the volume between reactor vessel 20 and containment vessel 10 may be at least partially filled with a gas and/or a fluid that increases heat transfer between the reactor vessel and the containment vessel.

In a particular implementation, reactor core 5 may be partially or completely submerged within a fluid, such as water, for example, which may include boron or other additive, which rises after making contact with a surface of the reactor core. In FIG. 1, the upward motion of heated coolant is represented by arrow 15 above reactor core 5. The coolant travels upward through riser column 30, which may be at least partially or approximately cylinder shaped, and over the top of steam generators 40 and 42 and is pulled downward by way of convection along the inner walls of reactor vessel 20, thus allowing the coolant to impart heat to steam generators 40 and 42. After reaching a bottom portion of the reactor vessel, contact with reactor core 5 results in heating the coolant as symbolized by arrow 15.

Although steam generators are 40 and 42 are shown as comprising distinct elements in FIG. 1, steam generators 40 and 42 may represent a number of helical coils that wrap around riser column 30, which may comprise a cylindrical shape. In another implementation, another number of helical coils may wrap around an upper portion of riser column 30 in an opposite direction, in which, for example, a first helical coil wraps in a counterclockwise direction, while a second helical coil wraps in a clockwise direction. However, nothing prevents the use of differently configured and/or differently oriented heat exchangers and embodiments are not limited in this regard. Further, although fluid line 70 is shown as being positioned just above upper portions of steam generators 40 and 42, in other implementations, reactor vessel 20 may include a lesser or a greater amount of coolant.

In FIG. 1, normal operation of the nuclear reactor proceeds in a manner wherein heated coolant rises through a channel defined by riser column 30 and makes contact with steam generators 40 and 42. After contacting steam generators 40 and 42, the coolant sinks towards the bottom of reactor vessel 20 in a manner that induces a thermal siphoning process as shown by arrows 25. In the example of FIG. 1, coolant within reactor vessel 20 remains at a pressure above atmospheric pressure, thus allowing the coolant to maintain a high temperature without vaporizing (i.e. boiling). As coolant within steam generators 40 and 42 increases in temperature, the coolant may begin to boil. As boiling commences, vaporized coolant is routed from a top portion of heat exchangers 40 and 42 to drive one or more of turbines 80 and 82 that convert the thermal potential energy of steam into electrical energy. After condensing, coolant is returned to a bottom portion of heat exchangers 40 and 42.

Plenums 85 are located at input ports of steam generators 40 and 42 of FIG. 1. In some embodiments, plenums 85 include an approximately flat tubesheet that couples coolant from turbines 80/82 to steam generators 40/42. At least one of plenums 85, which may be located proximate with a first horizontal plane that intersects a lower portion of riser column 30, comprises an approximately flat tubesheet wherein the flat tubesheet faces upward in the direction of a plane intersecting an upper portion of riser column 30. At least one of plenums 87, which may be located proximate with a second horizontal plane intersecting an upper portion of riser column 30, comprises an approximately flat tubesheet wherein the flat tubesheet faces in the direction of a lower portion of the plane intersecting riser column 30.

Figure 2:
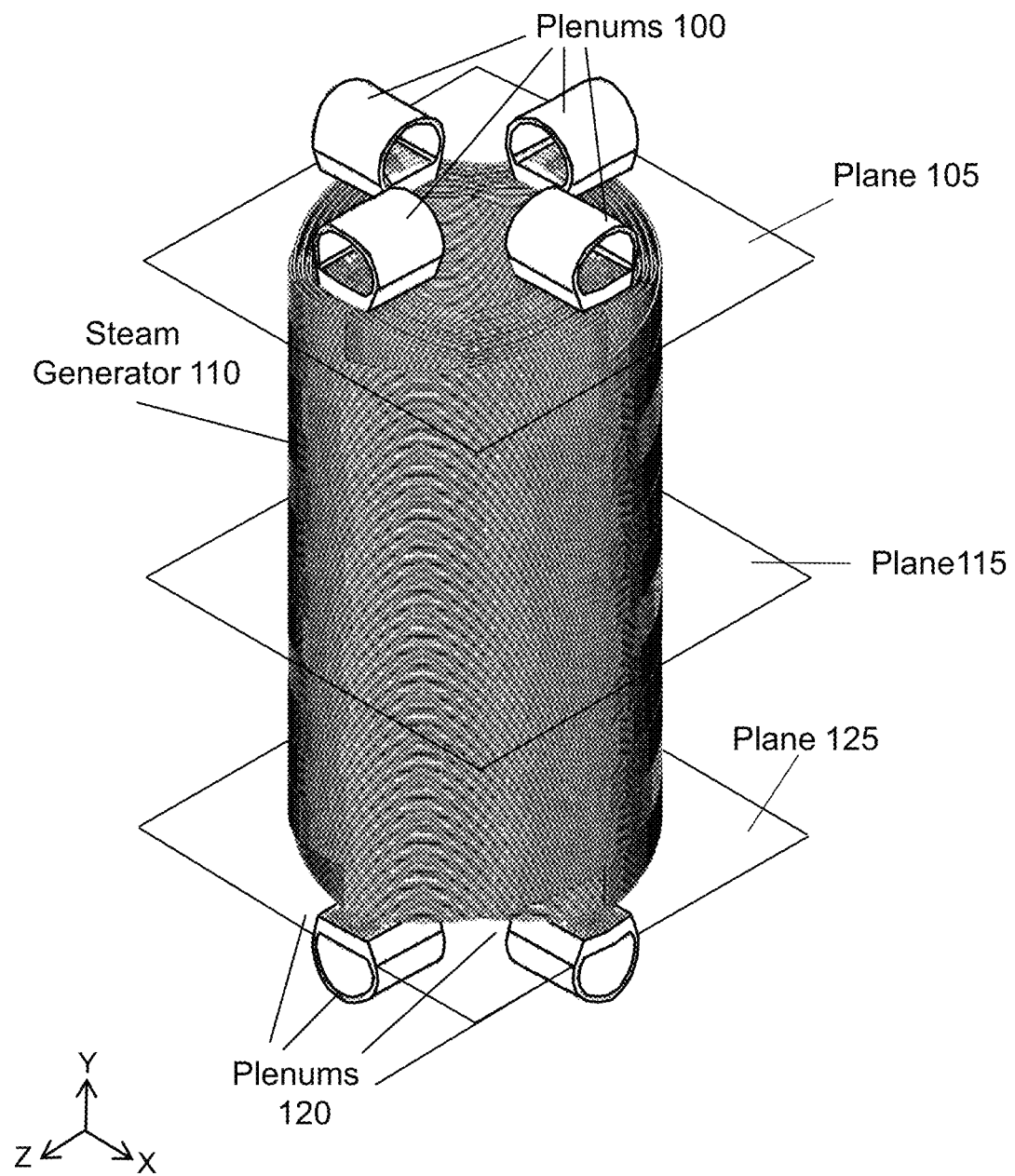
FIG. 2 shows a dimetric view of a steam generator around an approximately cylindrical riser column according to an example embodiment.

FIG. 2 shows a dimetric view of a steam generator around an approximately cylindrical riser column according to an example embodiment. In FIG. 2, a flowpath comprising several layers of closely spaced tubes can be seen as extending helically between plenums 100 and plenums 120. In some embodiments, plenums 100 are spaced at 90-degree intervals in a first plane, such as plane 105, around an approximately cylindrical shape that surrounds a riser column. Both plenums 100 and plenums 120 include an approximately flat tubesheet that faces in the direction of plane 115, which intersects a midsection of steam generator 110. In FIG. 2, the tubes extending between plenums 100 and 120 may comprise lengths of approximately 24.0 to 30.0 meters. In certain implementations, the use of three or more plenums proximate with plane 105 and three or more plenums proximate with plane 125 may result, at least in part, in reducing variation in length to a predetermined threshold of each of the steam generator tubes that forms a flowpath between one of plenums 120 with one or more of plenums 100, for example.

However, it should be noted that in other implementations, steam-generator tubes forming one more flowpaths between plenums 100 and 120 might comprise lengths of less than 24.0 meters, such as 22.0 meters, 20.0 meters, 18.0 meters, and other example lengths. In still other implementations, the tubes extending between plenums 100 and 120 comprise lengths greater than 30.0 meters, such as 32.0 meters, 35.0 meters, 40.0 meters, and other example lengths. Further, it should be understood that implementations and embodiments of the invention are not limited in this respect.

Plenums 120, which may be approximately located in plane 125 near a bottom portion of a riser column, may also be spaced at 90-degree intervals. In FIG. 2, both plenums 100 and 120 comprise approximately flat tubesheets, wherein each tubesheet comprises perforations for coupling coolant from a plenum to the tubes of steam generator 110. In the embodiment of FIG. 2, each of plenums 100, which may be proximate with plane 105, is shown as being approximately or directly above a corresponding plenum of plenums 120 proximate with plane 125. However, nothing prevents one or more of plenums 100 from being rotated in plane 105 with respect to plenums 120.

In some embodiments, tubesheets include perforations having a diameter of between 15.0 and 20.0 mm for coupling to the tubes of steam generator 110. However, other embodiments may make use of a tubesheet having perforations of less than 15.0 mm, such as 12.0 mm, 10.0 mm in diameter or smaller. Additionally, certain other embodiments may make use of a tubesheet having perforations greater than 20.0 mm in diameter, such as 25.0 mm, 30.0 mm, 35.0 mm, and other example diameters.

Figure 3:
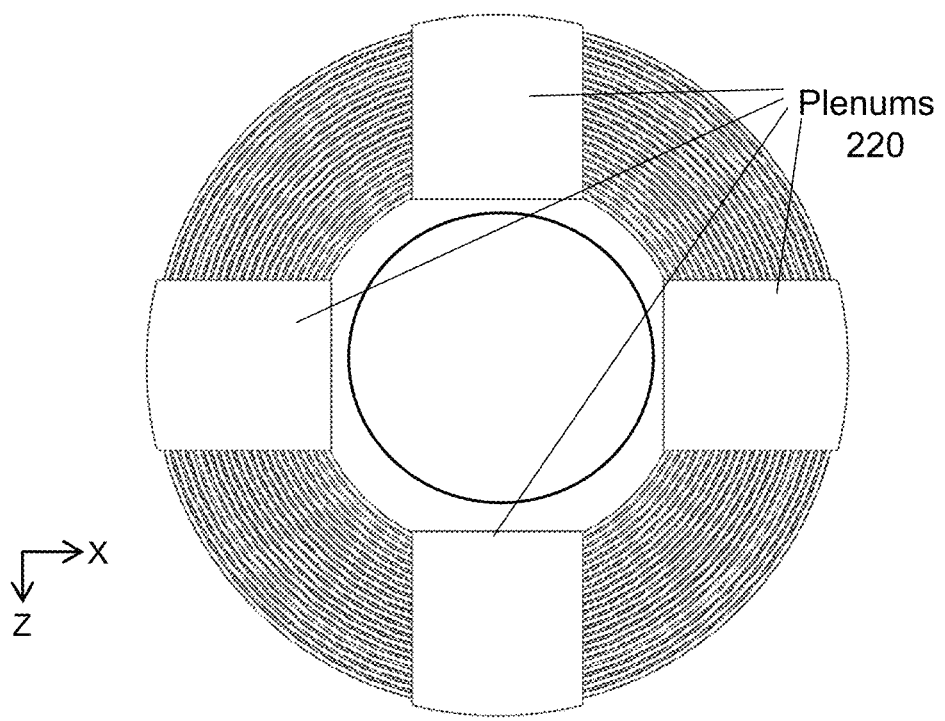
FIG. 3 shows a bottom view of a steam generator around an approximately cylindrical riser column according to an example embodiment.

FIG. 3 shows a bottom view of a steam generator around an approximately cylindrical riser column according to an example embodiment. In FIG. 3, plenums 220 may be spaced at approximately 90-degree intervals, for example, around an approximately circular shape, which may represent, for example, riser column 30 of FIG. 1. FIG. 3 also shows various concentric layers of steam generator tubes, which may surround a riser column.

Figure 4:
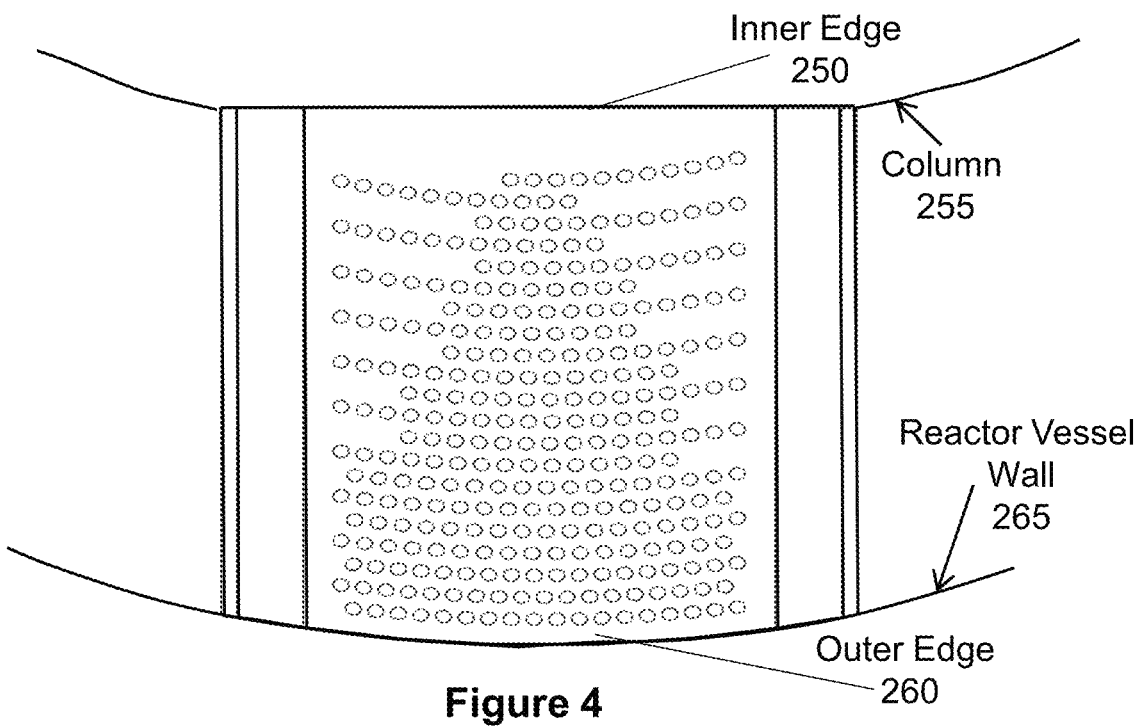
FIG. 4 shows details of a plenum used in a steam generator for a nuclear reactor according to an example embodiment.
Figure 5:
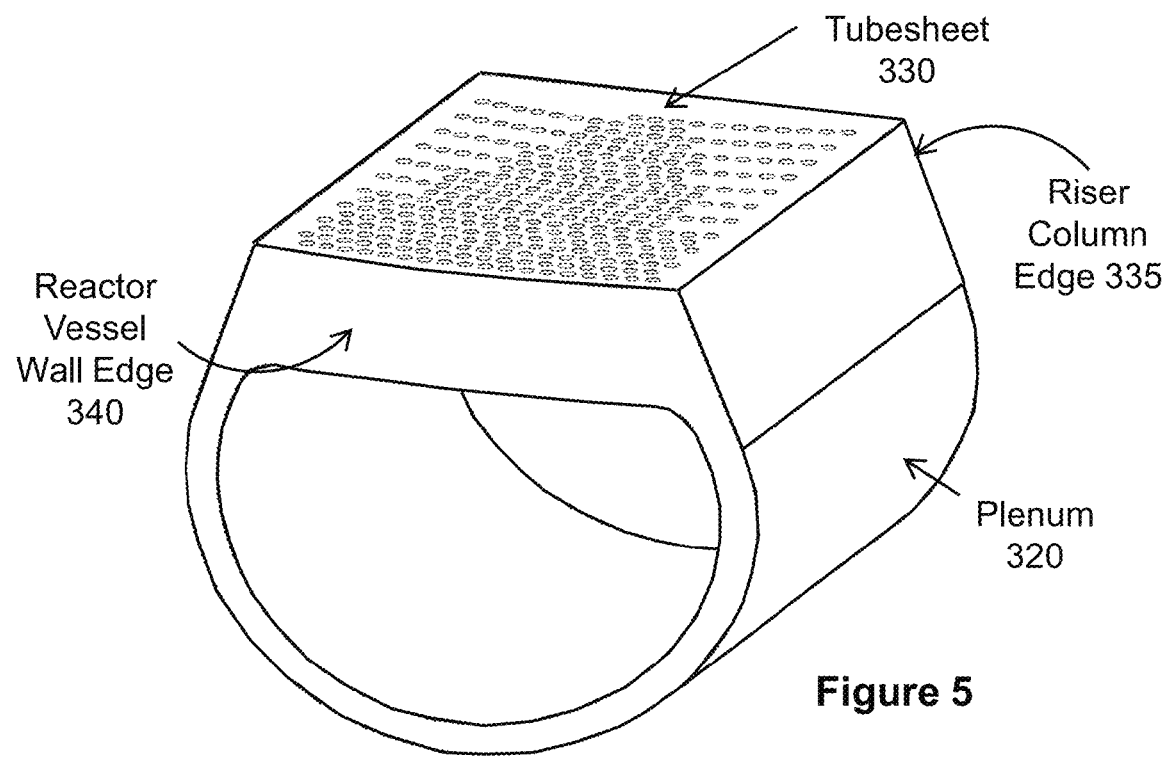
FIG. 5 shows a top view of plenum used in a steam generator for a nuclear reactor according to an example embodiment.

FIG. 4 shows a top view of a plenum used in a steam generator for a nuclear reactor according to an example embodiment. In FIG. 4, an approximately flat tubesheet having perforations suitable for coupling to individual tubes of a steam generator is shown. The perforations of FIG. 4 may be arranged in concentric arcs in which a larger number of perforations per unit area (e.g., higher density) may be present towards an outer edge, such as outer edge 260, than at inner edge 250 (e.g., lower density). In FIG. 5, edge 250 may correspond to a portion of the plenum closer to a cylindrical riser column, and outer edge 260 may correspond to a portion of the plenum closer to a wall of a reactor vessel, such as reactor vessel 20 of FIG. 1.

FIG. 5 shows details of a plenum used in a steam generator for a nuclear reactor according to an example embodiment. In FIG. 5, tubesheet 330 is shown as being approximately flat and comprising an increasing density of perforations as the distance from riser column edge 335 increases. At a portion of plenum 320 closer to reactor vessel wall edge 340, a much larger density of perforations may be present than at a portion of the tubesheet closer to riser column edge 335.

Figure 6:
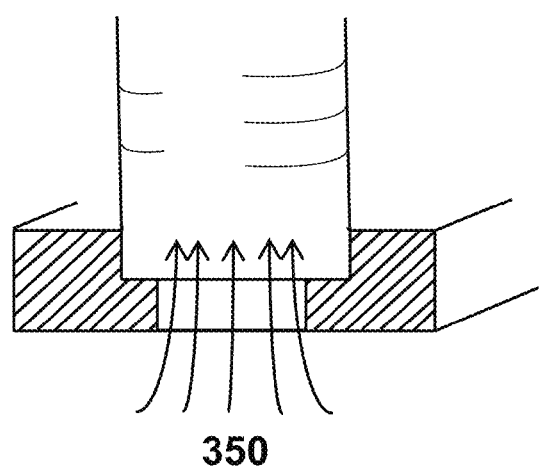
FIG. 6 shows an orifice used in a tubesheet perforation of a plenum used in a steam generator of a nuclear reactor according to an example embodiment.

FIG. 6 shows an orifice used in a tubesheet perforation of a plenum used in a steam generator of a nuclear reactor according to an example embodiment. In some embodiments, an orifice may be used to reduce pressure of coolant 350, for example, perhaps by an amount of at least 15.0% of an overall pressure drop brought about by the length of a steam generator tube. In some embodiments, by reducing the pressure of coolant 350, pressure stability, which may be of particular concern during startup conditions, for example, may be enhanced. By stabilizing pressure, such as by way of an orifice of FIG. 6 placed within at least some of the perforations of tubesheet 330 of FIG. 5, for example, momentary oscillations between wet steam and dry steam, which may be particularly prevalent during low power operation of the nuclear reactor module of FIG. 1 may be reduced or eliminated. In turn, this may reduce the possibility of wet steam being coupled into turbines 80 and 82 of FIG. 1, for example, which may degrade the performance of one or more of turbines 80 and 82.

In some embodiments, a method of operating a nuclear reactor may include conveying a working fluid from a first group of three or more plenums perhaps proximately located, for example, in a first plane of a reactor vessel, to a plurality of flowpaths. The conveying may include reducing pressure of the working fluid by an amount sufficient to preclude flow instability. In an embodiment, the percentage of pressure drop may comprise at least 15.0% of an overall pressure drop brought about by a length of steam generator tubing that may extend between a first plenum located at a first plane and a second plenum located at a second plane. The conveying may include coupling the working fluid to flowpaths through an approximately flat tubesheet of at least one plenum of the first group of three or more plenums. The method may further include vaporizing the working fluid in at least some of the plurality of flowpaths, wherein the vaporizing results, at least in part, from coupling thermal energy from a reactor coolant to at least some of the flowpaths. The method may further include transferring the vaporizing coolant to a second group of three or more plenums perhaps through an approximately flat tubesheet of at least one of the plenums.

While several examples have been illustrated and described, it will be understood by those skilled in the art that various other modifications may be made, and equivalents may be substituted, without departing from the scope of the following claims.

What is claimed is:

1. A nuclear reactor steam generator, comprising:
three or four plenums proximate with a first plane;
three or four plenums proximate with a second plane; and
a plurality of steam-generating tubes that form a coolant flowpath from one of the three or four plenums located proximate with the first plane to at least one of the three or four plenums proximate with the second plane,
wherein the steam generator is configured to be installed in a reactor vessel such that the first plane intersects a bottom portion of a riser column positioned in the reactor vessel and the second plane intersects a top portion of the riser column,
wherein each of the three or four plenums proximate with the first plane and each of the three or four plenums proximate with the second plane includes an approximately flat tubesheet that faces in a direction of a middle portion of the riser column, and
wherein the approximately flat tubesheet includes a plurality of perforations, the perforations being of lower density near an edge closer to the riser column than near an edge closer to a reactor vessel wall.

2. The nuclear reactor steam generator of claim 1, wherein each of the three or four plenums proximate with the second plane is directly above a corresponding one of the three or four plenums proximate with the first plane.

3. The nuclear reactor steam generator of claim 1, wherein at least some of the plurality of perforations include an orifice for reducing pressure at an inlet of a steam-generating tube.

4. The nuclear reactor steam generator of claim 3, wherein the orifice included with the at least some of the plurality of perforations introduces a pressure drop of at least 15.0% of an overall pressure drop brought about by a length of steam generator tubing extending between a first plenum located at the first plane and a second plenum located at the second plane.

5. The nuclear reactor steam generator of claim 1, wherein certain ones of the plurality of steam-generating tubes are interleaved with certain other ones of the plurality of steam-generating tubes.

6. A nuclear reactor steam generator, comprising:
a top portion having three or four plenums disposed in a plane around a riser column, wherein:
each of the three or four plenums includes an approximately flat tubesheet that faces a bottom portion of the steam generator, and
wherein the approximately flat tubesheets of the plenums include a plurality of perforations, and wherein the plurality of perforations changes in density between an area near an inner edge of the plenums and an area near an outer edge of the plenums.

7. The nuclear reactor steam generator of claim 6, wherein the density of the perforations changes from a smaller number at the area near the inner edge of the at least one plenums to a larger number near the outer edge of the at least one plenums.

8. The nuclear reactor steam generator of claim 6, wherein the plurality of perforations is arranged into a plurality of concentric arcs.

9. The nuclear reactor steam generator of claim 6, wherein each perforation of the plurality of perforations is between 15.0 and 20.0 mm in diameter.

10. A nuclear reactor steam generator, comprising:
three or four means for inletting a working fluid, wherein each of the means for inletting the working fluid are disposed around a riser column at a first height and are each approximately perpendicular to a longitudinal axis of the riser column;
three or four means for outletting a working fluid, wherein each of the means for outletting the working fluid are disposed around the riser column at a second height and are each approximately perpendicular to the longitudinal axis of the rise column; and
means for conducting heat to the working fluid from a reactor coolant and conveying the working fluid from at least one of the means for inletting to at least one of the means for outletting,
wherein each of means for inletting comprise approximately flat tubesheets that face a bottom portion of the steam generator, and
wherein the approximately flat tubesheets of the means for inletting each include a plurality of perforations, and a number of the plurality of perforations per unit of area of at least one of the approximately flat tubesheets changes between an area near an inner edge of each respective means for inletting and an area near an outer edge of each respective means for inletting.

11. The nuclear reactor steam generator of claim 10, wherein the means for inletting and the means for outletting comprise means for reducing a pressure of the working fluid.

12. The nuclear reactor steam generator of claim 10, wherein the approximately flat tubesheets couple the means for inletting to the means for conducting heat to and conveying the working fluid.

13. The nuclear reactor steam generator of claim 10, wherein each of the means for outletting comprise approximately flat tubesheets that face the top portion of the steam generator.

14. The nuclear reactor steam generator of claim 13, wherein the approximately flat tubesheets couple the means for outletting to the means for conducting heat to and conveying the working fluid.

15. The nuclear reactor steam generator of claim 13, wherein the approximately flat tubesheets of the means for outletting each include a plurality of perforations, and a number of the plurality of perforations per unit of area of at least one of the approximately flat tubesheets changes between an area near an inner edge of each respective means for outletting and an area near an outer edge of each respective means for outletting.

16. A nuclear reactor steam generating system, comprising:
a nuclear reactor comprising a riser column; and
a steam generator installed around the riser column, the steam generator comprising:
first, second, and third plenums proximate with a first plane, the first plane intersecting a bottom portion of the rise column,
first, second, and third plenums proximate with a second plane, the second plane being approximately parallel with the first plane and intersecting a top portion of the riser column; and
a plurality of steam-generating tubes that form a coolant flowpath from one of the first, second, and third plenums located proximate with the first plane to at least one of the fourth, fifth, and sixth plenums proximate with the second plane,
wherein the first, second, and third plenums proximate with the first plane and the first, second, and third plenums proximate with the second plane include approximately flat tubesheets that faces in a direction of a middle portion of the column, and
wherein the approximately flat tubesheets include a plurality of perforations, the perforations being of lower density near an edge closer to the riser column than near an edge closer to a reactor vessel wall.

* * * * *